United States Patent
Blease et al.

(10) Patent No.: US 7,066,991 B2
(45) Date of Patent: *Jun. 27, 2006

(54) INK JET INK SET

(75) Inventors: James W. Blease, Avon, NY (US); LuAnn K. Weinstein, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 10/695,119

(22) Filed: Oct. 28, 2003

(65) Prior Publication Data

US 2005/0087100 A1    Apr. 28, 2005

(51) Int. Cl.
C09D 11/02 (2006.01)
B41J 2/01 (2006.01)

(52) U.S. Cl. .............. 106/31.47; 106/31.49; 106/31.51; 106/31.52; 106/31.58; 106/31.48; 106/31.5; 347/100

(58) Field of Classification Search ............. 106/31.47, 106/31.49, 31.51, 31.52, 31.58, 31.6, 31.48, 106/31.5; 347/100
See application file for complete search history.

(56) References Cited

U.S. PATENT DOCUMENTS

| | | | | |
|---|---|---|---|---|
| 4,343,653 A | | 8/1982 | Beach et al. ............ | 106/31.27 |
| 5,725,641 A | | 3/1998 | MacLeod ................. | 106/31.5 |
| 5,851,273 A | * | 12/1998 | Morris et al. ........... | 106/31.27 |
| 5,961,670 A | * | 10/1999 | Cote et al. .............. | 8/652 |
| 6,152,969 A | | 11/2000 | Matsumoto et al. ...... | 8/658 |
| 6,183,548 B1 | | 2/2001 | Erdtmann et al. ....... | 106/31.48 |
| 6,685,768 B1 | * | 2/2004 | Blease et al. ........... | 106/31.47 |
| 6,749,674 B1 | * | 6/2004 | Geisenberger et al. ... | 106/31.52 |
| 2001/0027734 A1 | | 10/2001 | Geisenberger et al. ... | 106/31.52 |
| 2003/0061963 A1 | * | 4/2003 | Blease et al. ........... | 106/31.27 |
| 2004/0074018 A1 | * | 4/2004 | Wuzik et al. ........... | 8/543 |
| 2004/0128775 A1 | * | 7/2004 | Wuzik et al. ........... | 8/583 |
| 2005/0076806 A1 | * | 4/2005 | Hanmura et al. ........ | 106/31.48 |
| 2005/0087099 A1 | * | 4/2005 | Blease et al. ........... | 106/31.27 |
| 2005/0229810 A1 | * | 10/2005 | Blease et al. ........... | 106/31.5 |

FOREIGN PATENT DOCUMENTS

| | | |
|---|---|---|
| EP | 1 167 472 A1 | 1/2002 |
| EP | 1281737 | 7/2002 |
| JP | 02075672 | 3/1990 |
| WO | WO 01/72906 | 10/2001 |
| WO | WO 02/094943 | 11/2002 |

* cited by examiner

Primary Examiner—Helene Klemanski
(74) Attorney, Agent, or Firm—Doreen M. Wells; Sarah MeeksRoberts

(57) ABSTRACT

An ink jet set comprising: a) a cyan ink comprising a carrier and a sulfonated copper phthalocyanine dye; b) a magenta ink comprising a carrier and an anthrapyridone magenta dye or metal complex magenta dye, or azo-naphthol derivative magenta dye or mixture thereof; c) a yellow ink comprising a carrier and an azo-aniline yellow dye or metal complex yellow dye or mixtures thereof; and d) a trisazo black dye of the following structure

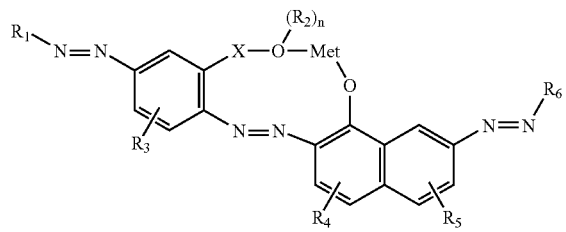

where Met is a metal atom, preferably Al, Co, Cr, Cu, Fe, or Ni; $R_1$ is a phenyl or naphthalene radical substituted by 1, 2 or 3 substituents selected from the group consisting of OH, O(C1–C6)-alkyl, COOM, $SO_3M$ and $NH_2$; $R_2$ is C1–C6-alkyl, n is 0 or 1, X is a chemical bond or —CO— or —$SO_2$—; $R_3$ is H, methyl or O(C1–C6)-alkyl; $R_4$ and $R_5$ are each H, COOM or $SO_3M$; $R_6$ is a phenyl, pyridyl or pyrazole radical substituted by 1,2 or 3 substituents selected from the group consisting of OH, O(C1–C6)-alkyl, COOM, $SO_3M$, $NH_2$, NHaryl, NHacyl and phenylsulfo; and M is ammonium, H, K, Li, or Na.

19 Claims, No Drawings

INK JET INK SET

CROSS REFERENCE TO RELATED APPLICATION

Reference is made to commonly assigned, co-pending U.S. patent application Ser. No. 10/695,165 by Blease et al., filed of even date herewith entitled "Ink Jet Ink Set".

FIELD OF THE INVENTION

This invention relates to inks for ink jet printing that provide images with good light fastness on laminated recording materials.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier recording materials include water, mixtures of water and organic co-solvents and high boiling organic solvents, such as hydrocarbons, esters, ketones, etc.

For aqueous dye-based inks, the dyes needs to be sufficiently soluble in water to prepare a solution that is capable of producing adequate density on the receiving element and stable for extended periods of storage without precipitation. High quality ink jet printing with dye-based inks requires dyes which will provide both bright hue and good light fastness.

To generate full color prints via ink jet printing, ink sets comprising at least cyan, magenta and yellow inks are normally utilized. In addition a black ink is often added to enhance the printing of text and darker colors. The range of colors that can be produced with a given set of inks defines the color gamut of that ink set. For the production of high quality photorealistic images via ink jet printing, ink sets with a large color gamut are preferred. In addition, it is important that the ink sets produce images with good fastness, especially to light.

The choice of the colorants in ink jet systems is critical for both light fastness and color gamut. The color gamut of an ink set is controlled primarily by the spectral absorption characteristics of the component dyes. The primary dyes (e.g., cyan, magenta and yellow) should only absorb light of the required wavelengths (i.e., have relatively narrow absorption bands) and not overlap excessively with the dyes in the complementary inks. In addition to the light absorption characteristics of the dyes, the maximum print density achieved from the ink is another important factor to provide a high color gamut. The higher the print density the greater the color gamut.

Of particular importance is the light fastness of the component dyes when printed on recording materials which are subsequently sealed with a laminating film. Lamination is done to protect the printed image from physical damage and also to further enhance the stability of the printed image against light fade and fade due to environmental pollutants such as ozone.

Recording material laminate films are available in a variety of forms and can be categorized on their mode of adhesion to the printed recording material. These forms include heat activated laminates, thermal laminates and pressure sensitive laminates. Laminate films can contain ultraviolet light absorbing compounds which can in part protect the printed dyes from fade due to ultraviolet light.

Numerous dye based ink jet ink sets have been described in patent literature. For example, U.S. Pat. No. 6,152,969 relates to a set of inks comprising C.I. Direct Blue 199, C.I. Direct Yellow 86 and an anthrapyridone magenta dye however no mention is made of a suitable black dye for the ink jet ink set. U.S. Pat. No. 6,183,548 B1 related to a set of inks comprising Direct Yellow 107, Direct Yellow 132 or Direct Yellow 86, a water soluble, transition metal complex of an 8-hetercyclylazo-5-hydroquinoline dye, a sulfonated copper phthalocyanine dye and black dyes selected from Reactive Black 31, Direct Black 19, Direct Black 168 or Solubilized Sulfur Black 1. Patent Application EP 1,167,472 discloses an ink jet ink set comprising C.I. Direct Blue 199, Ilford M-377 magenta dye (CAS # 182061-89-8) in a magenta dye mixture with C.I. Acid Red 52, C.I. Direct Yellow 132 and C.I. Food Black 2.

U.S. Pat. No. 5,725,641 describes Reactive Black 31, a disazo metal (specifically copper) complex dye as unsuitable for ink jet ink compositions since at neutral pH it hydrolyzes over time causing the ink pH to drop and an increase in sulfonate ions. This can be detrimental to metal surfaces in the ink jet print head due to corrosion resulting from the acidic pH and increased ion content. Direct Black 19 exhibits severe bronzing (a metallic like reflection) on several types of ink jet ink receiving media. Direct Black 168 and Food Black 2 both exhibit unacceptable light fastness when compared to the other dyes in an ink jet ink set. U.S. Pat. No. 4,343,653 states that because of hydrolysis of the thiosulfonate salt group, Solubilized Sulfur Black 1 will slowly precipitate from the ink and will likely result in clogging of the print head nozzles. What is needed then is an ink jet ink set comprising cyan, magenta, yellow and black inks all having good light fastness on laminated media and without the physical and chemical problems of black dyes previously included in ink jet ink sets.

U.S. patent application Publication 2001/0027734A1 describes black trisazo metal complex dyes for use in ink jet ink sets but preferred cyan, magenta and yellow dyes are not described, in particular for their ability to provide acceptable light fastness on laminated ink jet receivers.

It is an object of this invention to provide an ink set capable of producing images with high light fastness when printed on laminated recording materials.

SUMMARY OF THE INVENTION

The present invention discloses a color ink jet set for color printing comprising:
a) a cyan ink comprising a carrier and a sulfonated copper phthalocyanine dye;
b) a magenta ink comprising a carrier and an anthrapyridone magenta dye or metal complex magenta dye, azo-naphthol derivative magenta dye or mixture thereof;
c) a yellow ink comprising a carrier and an azoaniline yellow dye or metal complex yellow dye or mixtures thereof; and
d) a trisazo black dye of the follow structure

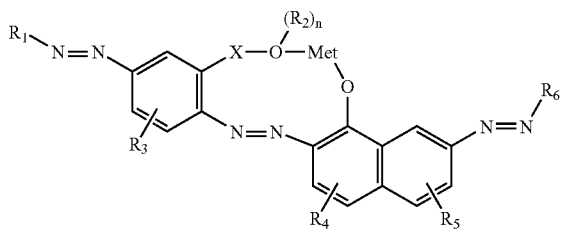

where
Met is a metal atom, preferably Al, Co, Cr, Cu, Fe, or Ni;
$R_1$ is a phenyl or naphthalene radical substituted by 1, 2 or 3 substituents selected from the group consisting of OH, O(C1–C6) alkyl, COOM, $SO_3M$ and $NH_2$;
$R_2$ is C1–C6 alkyl, n is 0 or 1, X is a chemical bond or —CO— or —$SO_2$—;
$R_3$ is H, methyl or O(C1–C6) alkyl;
$R_4$ and $R_5$ are each H, COOM or $SO_3M$;
$R_6$ is a phenyl, pyridyl or pyrazole radical substituted by 1,2 or 3 substituents selected from the group consisting of OH, O(C1–C6) alkyl, COOM, $SO_3M$, $NH_2$, NHaryl, NHacyl and phenylsulfo; and
M is ammonium, H, K, Li, or Na, as described in U.S. patent application Publication No. 2001/0027734A1, at page 2, the disclosure of which is incorporated herein by reference.

An ink jet ink set comprising the above cyan, magenta, yellow and black dyes provides excellent light fastness on laminated ink jet receivers while simultaneously avoiding the above problems described with other types of black dyes.

DETAILED DESCRIPTION OF THE INVENTION

Any copper phthalocyanine cyan dye or mixture thereof may be used in the cyan ink. In a preferred embodiment the cyan dye is C. I. Direct Blue 86, C. I. Direct Blue 199, Bayer Bayscript® BA, BASF Basacid® 762, or C. I. Direct Blue 307 (available as Avecia Pro-Jet® Fast Cyan 2).

Any metal complex magenta dye or anthrapyridone magenta dye or azo-naphthol derivative magenta dye or mixtures thereof may be used in the magenta ink. In a preferred embodiment the metal complex magenta dye is Kodak Lightfast Magenta 1 (CAS # 251959-65-6), C. I. Reactive Red 23, or pacified C. I. Reactive Red 23, the azo-naphthol derivative magenta dye is C. I. Reactive Red 31, pacified Reactive Red 31, or Ilford Magenta M-377 (CAS # 182061-89-8), and the anthrapyridone magenta dye is Nippon Kayaku JPD EK-1 (CAS# 224628-70-0), Acid Red 80, Acid Red 82 or CAS# 212080-60-9.

Any azo-aniline yellow dye or metal complex yellow dye or mixtures thereof may be used in the yellow ink. In a preferred embodiment the yellow azo-aniline dye is C.I. Direct Yellow 86, C.I. Direct Yellow 107, C. I. Direct Yellow 132, or C. I. Direct Yellow 173 and the yellow metal complex yellow dye is C.I. Acid Yellow 99 or C. I. Acid Yellow 114.

Any trisazo metal complex black dye or mixtures thereof may be used in the black ink. In a preferred embodiment, the trisazo dye is Clariant Duasyn® Black NB-SF. The black ink may also be adjusted for color by addition of a copper phthalocyanine cyan dye, a metal complex magenta dye, an anthrapyridone magenta dye, an azo-naphthol derivative magenta dye, an azo-aniline yellow dye, a metal complex yellow dye, an orange dye, a green dye, a violet dye or mixtures thereof.

In general, the inks of this invention comprise the above dyes at concentrations of 0.1 to 15%, preferably 0.4% to 6% by weight of the ink jet ink composition.

The ink jet ink may further comprise a light cyan ink and a light magenta ink. The light cyan ink may comprise a carrier and a sulfonated copper phthalocyanine dye. More specifically the light cyan ink may comprise a carrier and C. I. Direct Blue 86, C. I. Direct Blue 199, or C. I. Direct Blue 307 or mixtures thereof. The light magenta ink may comprise a carrier and an anthrapyridone magenta dye or metal complex magenta dye or azo-naphthol derivative magenta dye or mixture thereof mixture thereof. More specifically the light magenta ink may comprise a carrier and Kodak Lightfast Magenta 1 (CAS # 251959-65-6), C. I. Reactive Red 23, pacified C. I. Reactive Red 23, C. I. Reactive Red 31, pacified C. I. Reactive Red 31, CAS #182061-89-8, Acid Red 80, Acid Red 82, Nippon Kayaku JPD EK-1 (CAS# 224628-70-0) or CAS# 212080-60-9 or mixtures thereof. The ink jet ink set may further comprise a light yellow ink. The light yellow ink may comprise a carrier and an azoaniline yellow dye or metal complex yellow dye or mixtures thereof. More specifically the light yellow ink may comprise a carrier and C.I. Direct Yellow 86, C.I. Direct Yellow 107, C. I. Direct Yellow 132, or C. I. Direct Yellow 173 and the yellow metal complex yellow dye is C.I. Acid Yellow 99 or C. I. Acid Yellow 114 or mixtures thereof. The ink set may further comprise a light black (gray) ink comprising a carrier and a trisazo metal complex black dye, a carbon black pigment, a self-dispersing carbon black pigment or mixtures thereof.

A humectant is usually employed in the ink jet compositions of the invention to help prevent the ink from drying out or crusting in the orifices of the print head. Examples of humectants which can be used include polyhydric alcohols, such as ethylene glycol, diethylene glycol (DEG), triethylene glycol, propylene glycol, tetraethylene glycol, polyethylene glycol, glycerol, 2-methyl-2,4-pentanediol, 2-ethyl-2-hydroxymethyl-1,3-propanediol (EHMP), 1,5 pentanediol, 1,2-hexanediol, 1,2,6-hexanetriol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl, mono-ethyl or mono-butyl ether (TEGMBE), diethylene glycol di-methyl or di-ethyl ether, poly(ethylene glycol) monobutyl ether (PEGMBE), and diethylene glycol monobutylether (DEGMBE); nitrogen-containing compounds, such as urea, pyrrolidin-2-one, N-methyl-pyrrolidin-2-one, and 1,3-dimethyl-2-imidazolidinone; and sulfurcontaining compounds such as dimethyl sulfoxide, thioglycol, and tetramethylene sulfone.

Preferred humectants for the inks of the invention include DEG, glycerol, DEGMBE, TEGMBE, 1,2-hexanediol, 1,5-pentanediol, urea, pyrrolidin-2-one, EHMP and mixtures thereof. The humectant may be employed in each ink in an amount of from about 5 to about 60 weight percent of the ink composition.

Water-miscible organic solvents may also be added to the aqueous inks of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

The amount of aqueous carrier employed is in the range of approximately 40 to 98 weight %, preferably approximately 70 to 98 weight %, based on the total weight of the ink. A mixture of water and a polyhydric alcohol, such as diethylene glycol, is useful as an aqueous carrier. In a preferred embodiment, the inks contain from about 5 to about 60 weight % of water miscible organic solvent. More preferably, the ink contains from about 10% to about 35% of water miscible organic solvent. Percentages are based on the total weight of the aqueous carrier. In one embodiment the concentration of organic solvents and humectants is 5% to 50% by weight and water is 50% to 95% by weight.

Surfactants may be added to the ink to adjust the surface tension to an appropriate level. The surfactants may be anionic, cationic, amphoteric or nonionic and used at levels of 0.01 to 1% of the ink composition. Preferred surfactants include Surfynol® 465 (available from Air Products Corp.) and Tergitol® 15-S-5 (available from Union Carbide).

A biocide may be added to the ink composition employed in the invention to suppress the growth of microorganisms such as molds, fungi, etc. in aqueous inks. A preferred biocide for the ink composition employed in the present invention is Proxel® GXL (Avecia Corp.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye or pigment being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following components by weight: colorant (0.1–15%), water (20–95%), humectants (5–70%), water miscible co-solvents (2–20%), surfactants (0.1–10%), biocide (0.05–5%) and pH control agents (0.1–10%).

Additional additives which may optionally be present in the ink jet ink compositions employed in the invention include thickeners, conductivity enhancing agents, anti-kogation agents, drying agents, defoamers, anti-corrosion aids, viscosity modifying polymers, or sequestrants.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet inks of the present invention can be used in any of the popular ink jet printing systems, including thermal or piezoelectric drop-on-demand printers and continuous ink jet printers. Of course, the specific ink formulations will vary depending upon the type of ink jet printing system.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following example illustrates the utility of the present invention.

EXAMPLES

Preparation of Inks

Inks used in the invention and control inks were prepared by simple mixing of the ingredients. After thorough mixing, each ink was filtered with a 0.2 micron filter. The inks shown in table 1 were prepared.

TABLE 1

| ink # | color | dye class | dye | weight % dye in ink |
|---|---|---|---|---|
| 1 | cyan | copper phthalocyanine | Direct Blue 199[a] | 3.50 |
| 2 | cyan | copper phthalocyanine | Direct Blue 307[b] | 3.50 |
| 3 | magenta | anthrapyridone | Nippon Kayaku JPD EK-1[c] | 4.00 |
| 4 | magenta | anthrapyridone | Acid Red 82[d] | 4.00 |
| 5 | magenta | azo-naphthol | Magenta M-377[e] | 4.00 |
| 6 | magenta | metal complex | Reactive Red 23[f] | 4.00 |
| 7 | magenta | metal complex | Kodak Light Fast Magenta 1[g] | 1.00 |
| 8 | yellow | azoaniline | Direct Yellow 132[h] | 2.75 |
| 9 | yellow | azoaniline | Direct Yellow 86[i] | 2.75 |
| 10 | yellow | metal complex | Duasyn® GF-SF[j] | 2.75 |
| 11 | black | tris azo metal complex | Duasyn® NB-SF[k] | 4.00 |

[a]available as Duasyn® Direct Turquoise Blue FRL Liquid from Clariant Corp., a 10 wt. % dye solution in water
[b]available as Pro-Jet® Fast Cyan 2 from Avecia Inc., a 6 wt. % dye solution in water
[c]available as a 10 wt. % dye solution in water from Nippon Kayaku Kabushiki Kaisha
[d]available as a 10 wt. % dye solution in water from Bayer Corp.
[e]available as a dry solid from Ilford Imaging Switzerland, GmbH
[f]available as Duasyn® 3B-SF Liquid from Clariant Corp., a 15 wt. % dye solution in water
[g]available as a 5 wt % dye solution in water from Eastman Kodak Co.
[h]available as Pro-Jet® Yellow 1G from Avecia, Inc., a 7.5 wt. % dye solution in water
[i]available as a 10 wt. % dye solution in water from Sensient Technical Colors, Inc.
[j]available as a 4 wt. % dye solution in water from Clariant Corp.
[k]available as a 20 wt. % dye solution in water from Clariant Corp.

Due to the relatively high mass absorptivity of the Kodak Light Fast Magenta 1 dye, only 1 wt. % was needed in the magenta ink to achieve satisfactory image density. In addition to the dyes, all of the inks in table 1 were prepared with 23 wt. % glycerol, 7.0 wt % triethylene glycol mono-butyl ether, 0.3 wt. % triethanolamine and 0.09 wt. % lactic acid with the balance being water.

As comparative examples, the inks in table 2 were prepared.

TABLE 2

| ink # | color | dye | weight % dye |
|---|---|---|---|
| C-1 | cyan | Acid Blue 9[l] | 3.50 |
| C-2 | magenta | Acid Red 52[m] | 4.00 |
| C-3 | yellow | Acid Yellow 23[n] | 2.75 |
| C-4 | black | Food Black 2[o] | 4.00 |
| C-5 | black | Direct Black 168[p] | 4.00 |

[l]available from Sensient Technical Colors as a 10 wt. % dye solution in water
[m]available from Sensient Technical Colors as a 10 wt. % dye solution in water
[n]available as Pro-Jet® Yellow OAM from Avecia, Inc., a 7.5 wt. % dye solution in water
[o]available from Sensient Technical Colors as a 10 wt. % dye solution in water
[p]available as Pro-Jet® Direct Black 168 from Avecia, Inc., a 10 wt. % dye solution in water In addition to the dyes, all of the inks in table 2 were prepared with 23 wt. % glycerol, 7.0 wt % triethylene glycol mono-butyl ether, 0.3 wt. % triethanolamine and 0.09 wt. % lactic acid with the balance being water.

To evaluate the inks of the invention and the comparative inks, each ink was placed in an ink cartridge for a Canon Model S520 printer and printed using the Canon model S520 printer. A density scale was created by printing areas at 10%, 25%, 40%, 50%, 75% and 100% dot coverage. The inks of the invention and the comparative inks were printed onto Kodak Instant Dry Glossy media and Ilford Instant Dry (IDP1GP9) media. Approximately 1 day after printing, the printed media were laminated using Kodak Pro-Lustre lamination film.

Each density patch was measured for The Status A visual, red, green and blue densities using a MacBeth-Gretag Spectrolino densitometer. The Kodak media and Ilford media were read in reflection mode. After measuring, the printed and laminated media were exposed to 50 kLux simulated daylight radiation for two weeks. High intensity exposure such as this is intended to provide an accelerated response to normal use conditions wherein the light exposure is of much lower intensity but the exposure is for a much longer duration. It is desired for each ink of the ink set to fade less than about 30% in density from a starting density of 1.0 on one or both of the media types used to evaluate the inks. Each density patch was then re-read after the high intensity exposure to assess the light fastness of each density patch. For cyan inks, the change in Status A red density was recorded, for the magenta inks the change in Status A green density was recorded, for the yellow inks the change in Status A blue density was recorded and for the black inks, the change in Status A visual density was recorded. The percent change in density from an initial starting density of 1.0 was determined by linear interpolation between areas with starting densities which were less than and greater than 1.0 density. Inks having less than about 10% fade are indicated with an A rating, from 10% fade to less than about 20% fade a B rating, from 20% fade to less than about 30% fade a C rating and 30% or more fade a D rating. The results for the inks of the invention and the comparative examples are shown in table 3.

TABLE 3

| | % density loss after 2 weeks exposure at 50 kLux daylight | |
|---|---|---|
| Ink # | Kodak Instant Dry Glossy media | Ilford Instant Dry media |
| 1 | B | A |
| 2 | B | A |
| 3 | B | C |
| 4 | C | C |
| 5 | B | C |
| 6 | B | D |
| 7 | B | B |
| 8 | C | A |
| 9 | B | A |
| 10 | B | B |
| 11 | A | A |
| C-1 | D | D |
| C-2 | D | D |
| C-3 | D | D |
| C-4 | D | D |
| C-5 | D | D |

The inks of the invention set all show percent fade values from an initial density of 1.0 or less than about 30% on at least one of the media types. Thus an ink jet set comprising a cyan, magenta, yellow and black ink selected from among the inks of the invention will provide laminated prints with only slight color shifts due to light fade. In addition, the black ink comprising a trisazo metal complex black dye did not show any bronzing on printing and was pH stable (unlike the pH instability with the bisazo metal complex dye Reactive Black 31 as discussed in U.S. Pat. No. 5,725,641).

The comparative inks all show unacceptable fade which if used in an ink jet ink set would result in objectionable losses in print density and objectionable colors shifts (due to non-uniform fade among the inks) from exposure to light over time.

The invention has been described in detail with particular reference to useful embodiments thereof, but it will be understood that variations and modifications can be effected within the spirit and scope of the invention.

What is claimed is:

1. An ink jet set comprising:
   A) a cyan ink comprising a carrier and a sulfonated copper phthalocyanine dye;
   B) a magenta ink comprising a carrier and an anthrapyridone magenta dye;
   C) a yellow ink comprising a carrier and an azo-aniline yellow dye or metal complex yellow dye or mixtures thereof; and
   D) a black ink comprising a trisazo black dye of the following structure

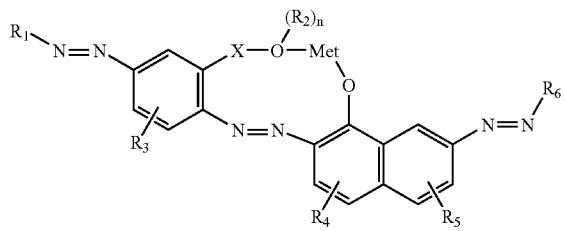

where

Met is a metal atom;

$R_1$ is a phenyl or naphthalene radical substituted by 1, 2 or 3 substituents selected from the group consisting of OH, O(C1–C6)-alkyl, COOM, $SO_3M$ and $NH_2$;

$R_2$ is C1–C6-alkyl, n is 0 or 1, X is a chemical bond or —CO— or —$SO_2$—;

$R_3$ is H, methyl or O(C1–C6)-alkyl;

$R_4$ and $R_5$ are each H, COOM or $SO_3M$;

$R_6$ is a phenyl, pyridyl or pyrazole radical substituted by 1,2 or 3 substituents selected from the group consisting of OH, O(C1–C6)-alkyl, COOM, $SO_3M$, $NH_2$, NHaryl, NHacyl and phenylsulfo; and M is ammonium, H, K, Li, or Na.

2. An ink jet ink set according to claim 1 wherein the dye in each ink is present in the ink in a concentration of 0.1% to 15% by weight of the ink composition.

3. An ink jet ink set according to claim 1 wherein the cyan ink comprises a carrier and C. I. Direct Blue 86, C. I. Direct Blue 199, or C. I. Direct Blue 307 or mixtures thereof.

4. An ink jet ink set according to claim 1 wherein the magenta ink comprises a carrier and CAS# 224628-70-0, Acid Red 80, Acid Red 82, or CAS# 212080-60-9 or mixtures thereof.

5. An ink jet ink set according to claim 1 wherein the yellow ink comprises a carrier and C.I. Direct Yellow 86, C.I. Direct Yellow 107, C. I. Direct Yellow 132, or C. I. Direct Yellow 173 and the yellow metal complex yellow dye is C.I. Acid Yellow 99 or C. I. Acid Yellow 114 or mixtures thereof.

6. An ink jet ink set according to claim 1 wherein the ink set further comprises a light cyan ink and a light magenta ink.

7. An ink jet ink set according to claim 6 wherein the light cyan ink comprises a carrier and a sulfonated copper phthalocyanine dye.

8. An ink jet ink set according to claim 7 wherein the light cyan ink comprises a carrier and C. I. Direct Blue 86, C. I. Direct Blue 199, or C. I. Direct Blue 307 or mixtures thereof.

9. An ink jet ink set according to claim 6 wherein the light magenta ink comprises a carrier and an anthrapyridone magenta dye or metal complex magenta dye or azo-naphthol derivative magenta dye or mixture thereof mixture thereof.

10. An ink jet ink set according to claim 9 wherein the light magenta ink comprises a carrier and Acid Red 80, Acid Red 82, (CAS# 224628-70-0) or CAS# 212080-60-9 or mixtures thereof.

11. An ink jet ink set according to claim 6 wherein the ink set further comprises a light yellow ink.

12. An ink jet ink set according to claim 11 wherein the light yellow ink comprises a carrier and an azoaniline yellow dye or metal complex yellow dye or mixtures thereof.

13. An ink jet ink set according to claim 12 wherein the yellow ink comprises a carrier and C.I. Direct Yellow 86, C.I. Direct Yellow 107, C. I. Direct Yellow 132, or C. I. Direct Yellow 173 and the yellow metal complex yellow dye is C.I. Acid Yellow 99 or C. I. Acid Yellow 114 or mixtures thereof.

14. An ink jet ink set according to claim 11 wherein the ink set further comprises a light black (gray) ink comprising a carrier and a trisazo metal complex black dye, a carbon black pigment, a self-dispersing carbon black pigment or mixtures thereof.

15. An ink jet ink set according to claim 1 wherein the carrier comprises water and water soluble organic solvents, humectants or a combination thereof.

16. An ink jet ink set according to claim 5 wherein the humectants are selected from the group consisting of glycerol, diethylene glycol, diethylene glycol monobutyl ether, triethylene glycol monobutyl ether, 2-pyrrolidinone, urea and mixtures thereof.

17. An ink jet ink set according to claim 15 wherein the concentration of organic solvents, and humectants is 5% to 50% by weight and water is 50% to 95% by weight.

18. An ink jet ink set according to claim 16 wherein the carrier further comprises a non-ionic surfactant.

19. An ink jet printing method, comprising the steps of:
A) providing an ink jet printer that is responsive to digital data signals;
B) loading said printer with an ink jet recording element comprising a support having thereon an image-receiving layer;
C) loading said printer with an ink jet ink set comprising:
  a) a cyan ink comprising a carrier and a sulfonated copper phthalocyanine dye;
  b) a magenta ink comprising a carrier and an anthrapyridone magenta dye;
  c) a yellow ink comprising a carrier and an azo-aniline yellow dye or metal complex yellow dye or mixtures thereof; and
  d) a black ink comprising a trisazo black dye of the following structure

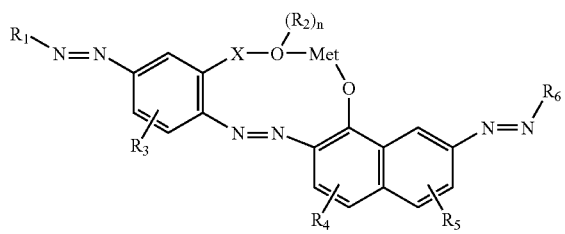

where

Met is a metal atom;

$R_1$ is a phenyl or naphthalene radical substituted by 1, 2 or 3 substituents selected from the group consisting of OH, O(C1–C6)-alkyl, COOM, $SO_3M$ and $NH_2$;

$R_2$ is C1–C6-alkyl, n is 0 or 1, X is a chemical bond or —CO— or —$SO_2$—;

$R_3$ is H, methyl or O(C1–C6)-alkyl;

$R_4$ and $R_5$ are each H, COOM or $SO_3M$;

$R_6$ is a phenyl, pyridyl or pyrazole radical substituted by 1,2 or 3 substituents selected from the group consisting of OH, O(C1–C6)-alkyl, COOM, $SO_3M$, $NH_2$, NHaryl, NHacyl and phenylsulfo; and M is ammonium, H, K, Li, or Na; and D) printing on said image-receiving layer using said ink jet ink set in response to said digital data signals.

* * * * *